(12) United States Patent
Jamet

(10) Patent No.: US 6,480,652 B1
(45) Date of Patent: Nov. 12, 2002

(54) CABLE INCLUDING OPTICAL FIBERS ENCLOSED IN A SHEATH WITH LONGITUDINAL REINFORCING ELEMENTS

(75) Inventor: Patrick Jamet, Marolles/Seine (FR)

(73) Assignee: Sagem SA, Paris (FR)

( * ) Notice: Subject to any disclaimer, the term of this patent is extended or adjusted under 35 U.S.C. 154(b) by 0 days.

(21) Appl. No.: 09/700,394
(22) PCT Filed: May 11, 1999
(86) PCT No.: PCT/FR99/01118
§ 371 (c)(1), (2), (4) Date: Nov. 14, 2000
(87) PCT Pub. No.: WO99/60435
PCT Pub. Date: Nov. 25, 1999

(30) Foreign Application Priority Data

May 18, 1998 (FR) .............................................. 98 06230

(51) Int. Cl.$^7$ ................................................. G02B 6/44
(52) U.S. Cl. .......................................... 385/102; 385/113
(58) Field of Search .................................. 385/100–114

(56) References Cited

U.S. PATENT DOCUMENTS

| | | | | |
|---|---|---|---|---|
| 4,844,575 A | * | 7/1989 | Kinard et al. | 385/113 |
| 5,050,957 A | * | 9/1991 | Hamilton et al. | 385/113 |
| 5,109,457 A | * | 4/1992 | Panuska et al. | 385/102 |
| 5,982,965 A | * | 11/1999 | Cheron et al. | 385/100 |
| 6,101,305 A | * | 8/2000 | Wagmenn et al. | 385/113 |
| 6,259,844 B1 | * | 7/2001 | Logan et al. | 385/113 |

FOREIGN PATENT DOCUMENTS

| | | |
|---|---|---|
| DE | 2635917 | 2/1978 |
| JP | 5-8150907 | 9/1983 |

* cited by examiner

Primary Examiner—Brian Sircus
Assistant Examiner—Son V. Nguyen
(74) Attorney, Agent, or Firm—Birch, Stewart, Kolasch & Birch, LLP

(57) ABSTRACT

A cable including optical fibers (1) surrounded by a sheath (2) comprising at least one layer in which at least two elongate reinforcement members (4) extend, the cross section of the sheath having a substantially oval outline (5) presenting a minor axis (5.1), and the reinforcement members being disposed symmetrically on either side of the minor axis.

1 Claim, 1 Drawing Sheet

CABLE INCLUDING OPTICAL FIBERS ENCLOSED IN A SHEATH WITH LONGITUDINAL REINFORCING ELEMENTS

This application is the national phase under 35 U.S.C. §371 of PTC International Application No. PCT/FR99/01118 which has an International filing date of May 11, 1999, which designated the United States of America.

The present invention relates to a cable including optical fibers surrounded by a sheath having longitudinal reinforcement.

BACKGROUND OF THE INVENTION

In the cable industry, it is well known that optical fibers must not be subjected to mechanical stress if their transmission performance or their lifespan are not to be degraded.

Optical fibers are therefore disposed in a sheath which protects them mechanically against traction, longitudinal compression, and crushing forces.

Furthermore, in order to limit stress on the optical fibers both while the cables are laid and during temperature variations which cause the materials constituting the sheath to expand or retract, it is known to use reinforcement members extending in a layer of the sheath of the cable.

It is found that the resistance to crushing depends mainly on the thickness of the material forming the sheath. A cable-crushing force applied to the sheath over the reinforcement members is not absorbed sufficiently by the sheath and is therefore transmitted to the reinforcement members which run the risk, under said force, of causing the sheath to tear. This results in a risk of damage to the optical fibers.

Document FR-A-2 745 642 proposes an optical fiber cable having a sheath that includes four diametrally opposite projecting ribs extending along the length of the cable. Such a cable has good crushing strength. However, it poses sealing problems both when connected to a connection box and when laid in a conduit by using a flow of compressed air. Furthermore, as a result of its structure, such a cable is difficult to wind evenly onto a reel and slides with considerable friction in a cylindrical conduit.

Document DE-A-26 35 917 discloses a cable which includes optical fibers surrounded by a sheath whose cross-section has an oval outline presenting a minor axis. The sheath comprises a layer in which elongate reinforcement members extend, the reinforcement members being disposed on either side of the minor axis. The cable thus has greater crushing strength along the direction of the minor axis and, when the cable rests on a support, its oval outline causes the cable naturally to take up an orientation such that the minor axis extends perpendicularly to the support, i.e. in the direction in which crushing forces usually act. However, that cable is markedly oval in shape which makes sealing difficult at connection boxes. The oval shape also enables the cable to be wound evenly onto a reel and to slide with little friction in a cylindrical conduit.

OBJECTS AND SUMMARY OF THE INVENTION

An object of the invention is to propose an optical fiber cable which can withstand a significant amount of crushing, without affecting its bending properties or its suitability for sealed mounting at its end.

In order to achieve this object, the invention provides a cable including optical fibers surrounded by a sheath whose cross-section has a substantially oval outline presenting a minor axis, the sheath comprising at least one layer in which at least two elongate reinforcement members extend, the reinforcement members being disposed symmetrically on either side of the minor axis, the ovalization of the outline lying in the range 1% to 10%.

The ovalization is thus sufficient for the cable naturally to take up a position presenting greatest crushing strength in the appropriate direction when it rests on a support. Furthermore, in this position, the relative flexibility of the cable in various directions is such as to minimize the risk of the cable undulating while it is being pushed into place in a conduit. In addition, the cable ends are generally mounted in cylindrical endpieces with clearance such that the above-mentioned ovalization of the outline of the cable does not affect the possibility of providing a sealing of the inlet of connection or splice boxes.

BRIEF DESCRIPTION OF THE DRAWINGS

Other characteristics and advantages of the invention will appear on reading the following description of a particular non-limiting embodiment of the invention.

It is made with reference to the sole accompanying FIGURE which is a cross-section view of the cable of the invention.

MORE DETAILED DESCRIPTION

Figure 1:
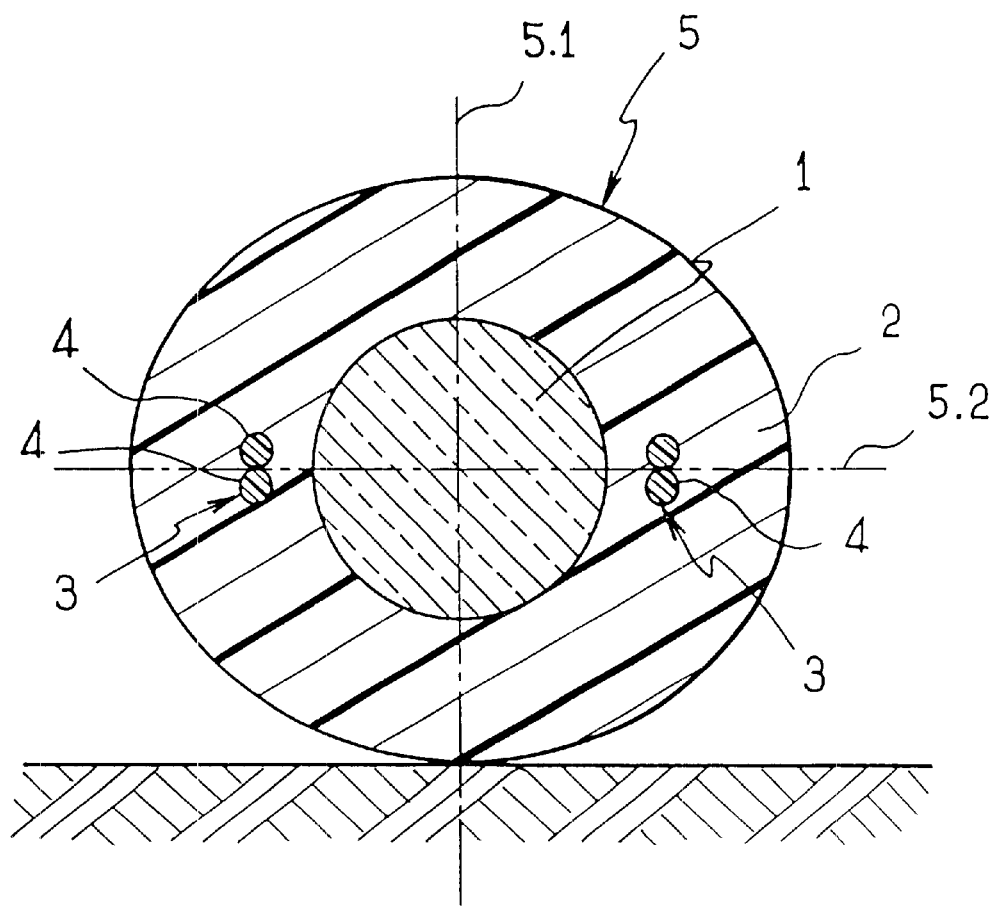

With reference to the FIGURE, the cable of the invention includes a bundle of optical fibers 1 whose structure is not shown in detail, but which can, for example, be made in the form of one or more groups of optical fibers held together by a holding sheath, as described in document FR-A-2 665 266.

The bundle of optical fibers is surrounded by an outer sheath 2, in this case made of a single layer, having embedded therein two groups 3, each constituted by two reinforcement members 4. The reinforcement members are made of conventional materials such as wires, or strands of glass or aramid fiber stiffened by a resin having a high traction modulus and a low thermal expansion coefficient.

In the invention, the sheath at rest has a cross-section with an outline that is substantially oval in shape, as shown in the FIGURE. The outline 5 shown presents a minor axis of symmetry 5.1 (vertical in the FIGURE) and a major axis of symmetry 5.2 (horizontal in the FIGURE), but the oval shape of the invention covers any curvilinear-shaped outline whose curvature is essentially turned towards the inside of the outline without being re-entrant, and has different dimensions along two substantially perpendicular directions, the directions being called axes although they are not necessarily axes of symmetry. In this case, the sheath is made by extrusion by means of a die having an orifice of oval outline, but other embodiments could be used.

The ovalization of the outline 5 lies in the range 1% to 10%. Ovalization is expressed as the ratio of twice the difference between the long dimension and the short dimension of the outline (respectively measured along the axes 5.2 and 5.1) over the sum of the long dimension plus the small dimension of the outline.

The groups 3 of reinforcement members 4 extend symmetrically on either side of the minor axis of symmetry 5.1.

It will be understood that when the cable of the invention is laid on a support 6 it is naturally oriented by its oval outline 5 so that the minor axis of symmetry 5.1 extends substantially perpendicularly to the support 6. Thus, if an operator walks on the cable, the crushing force is applied along the direction of the axis of symmetry 5.1, i.e. the direction in which the cable has the best crushing strength. Furthermore, this spontaneous orientation of the cable has the advantage of making it easier to locate the reinforcement members in the sheath, so that it is easy to make an incision in the sheath without damaging the reinforcement members in order to access the optical fibers.

It should be noted that the ovalization values mentioned are sufficient to favor an orientation of the cable on the support, while ensuring that it is still easy to seal the connection boxes to which the cable is connected.

Naturally, the invention is not limited to the embodiment described and variations can be applied thereto without going beyond the ambit of the invention as defined by the claim.

In particular, although the cross section of the outer sheath has been shown in the FIGURE as having a circular inside contour, its inside contour could be oval in shape. Furthermore, the sheath could be a multilayer sheath.

Although the reinforcement members are described as being formed of two groups of two reinforcement members each, a cable could be made comprising only two reinforcement members disposed symmetrically about the minor axis of symmetry, or comprising two groups each having more than two reinforcement members.

What is claimed is:

1. A cable including optical fibers (1) surrounded by a sheath (2) having a cross-section which has a substantially oval outline (5) presenting a minor axis (5.1) and a major axis (5.2), the sheath comprising at least one layer in which at least two elongate reinforcement members (4) extend, the reinforcement members being disposed symmetrically on either side of the minor axis, wherein said outline (5) has no re-entrant portion and has an ovalization, that is a ratio of twice the difference between a longest dimension taken along said major axis and a shortest dimension taken along said minor axis of the outline over a sum of the longest dimension plus the shortest dimension of the outline (5), which lies in the range of from 1% to 10%.

* * * * *